Sept. 29, 1970 V. L. OTT 3,530,653
LAWN EDGE AND HEDGE TRIMMER
Filed Jan. 30, 1968
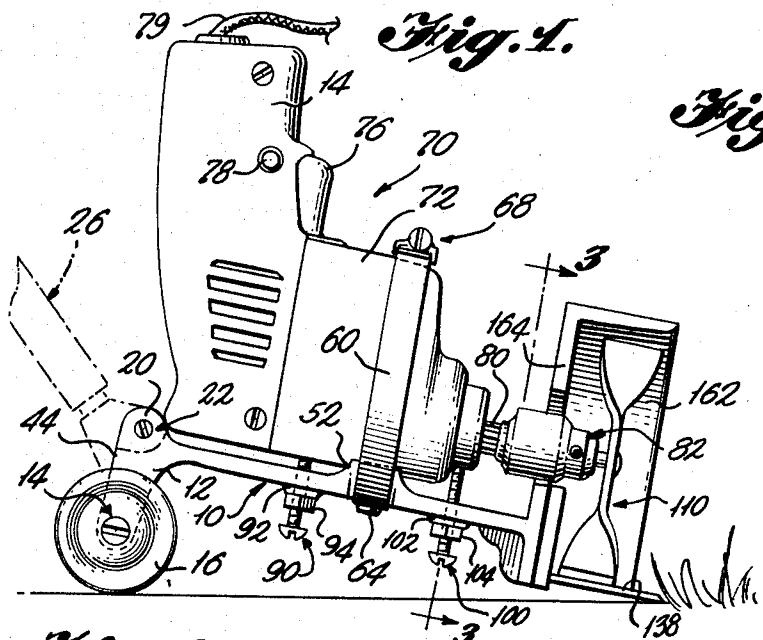
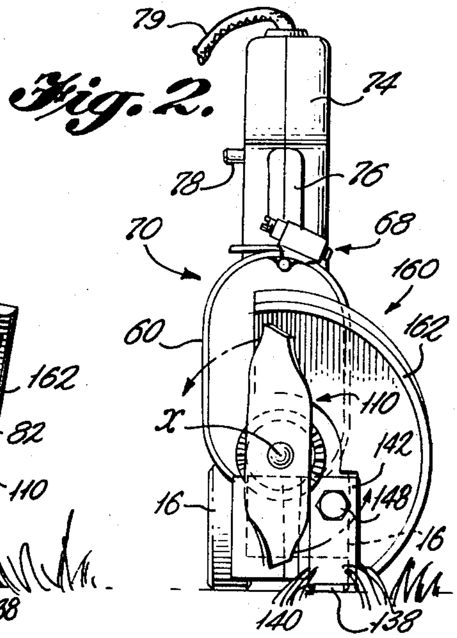
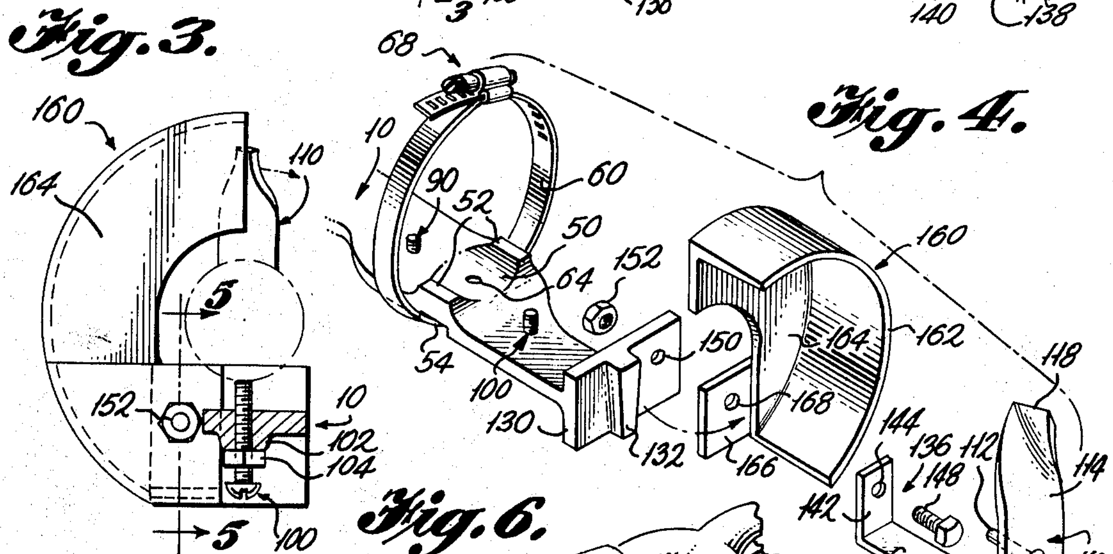
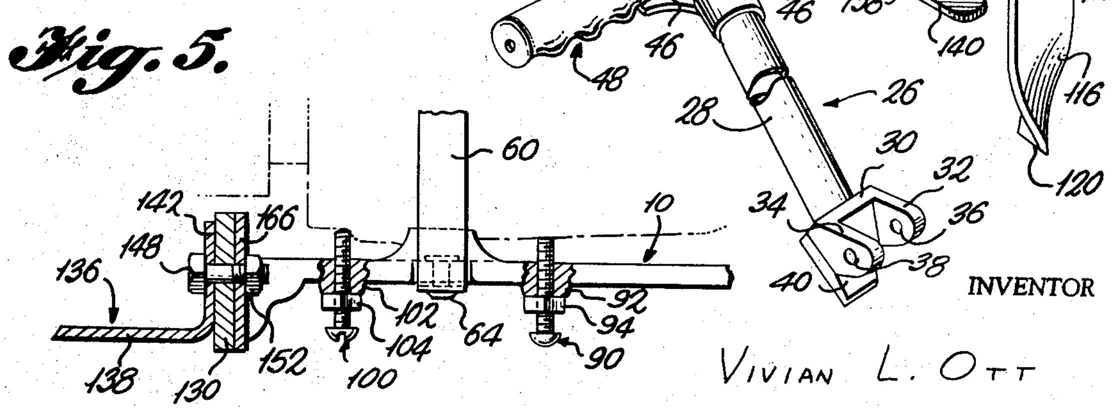
INVENTOR
VIVIAN L. OTT
BY Shoemaker and Mattare
ATTORNEYS United States Patent Office 3,530,653
Patented Sept. 29, 1970

3,530,653
LAWN EDGE AND HEDGE TRIMMER

Vivian L. Ott, 7328 Hampton Blvd., Apt. 3A, Norfolk, Va. 23505

Filed Jan. 30, 1968, Ser. No. 701,590
Int. Cl. A01d *53/14*
U.S. Cl. 56—25.4 12 Claims

ABSTRACT OF THE DISCLOSURE

A body means has wheels rotatably mounted at one end thereof and a fixed ledger blade mounted at the opposite end thereof. A conventional power drill is held in place on the body means and means is provided for accurately adjusting the position of the power drill. A rotatable cutting blade or cutter means is connected with the power drill and cooperates with the fixed, ledger blade to cut vegetation. A guard means is mounted adjacent to the rotatable cutter means, and a handle for manipulating the apparatus is pivotally interconnected with the body means adjacent the wheels supported thereby.

BACKGROUND OF THE INVENTION

The present invention relates to an implement for gardening use, and is particularly directed to an arrangement for trimming lawn edges and hedges or similar ornamental bushes.

The present invention represents an improvement over the arrangement shown in U.S. Pat. 3,218,789. In this prior art patent, the device is designed to be slid along a supporting surface, and in actual use it is difficult to properly maneuver the device and to guide it along the desired line.

The handle means utilized in the arrangement shown in the aforementioned patent is disposed in fixed relation to an upper intermediate portion of the apparatus. This particular manner of interconnection of the handle means with the apparatus makes it difficult to maneuver the device in the desired manner, and the angular relationship of the handle means with respect to the apparent is fixed which causes it to sometimes be in an awkward position.

The clippings created by the cutting action of the apparatus shown in this prior art patent have a tendency to fly in all directions and this of course is undesirable when trimming along a sidewalk or the like since the clippings are sprayed in a random fashion over the sidewalk and must subsequently be cleaned off to present a neat appearance.

In the arrangement shown in this prior patent, additional coupling means is required for connecting the power drill to the rotatable cutter means, and this of course presents additional structure and complexity to the apparatus.

A further disadvantage of the structure disclosed in this U.S. patent is that the rotatable cutter means is mounted about a fixed axis, and it is difficult to properly align the power drill with the fixed axis of rotation of the movable cutter means, and furthermore, no adjustment of the movable cutter means with respect to the ledger blade of the apparatus is possible.

SUMMARY OF THE INVENTION

In the present invention, the body means of the device is supported by a pair of wheels which enable the apparatus to be readily moved over a supporting surface. These wheels are additionally disposed so that a pair of wheels are positioned substantially equidistantly at either side of the longitudinal axis of the apparatus thereby tending to stabilize and help guide the movement of the apparatus.

The handle means in the present invention is pivotally connected with the body means thereof so as to enable the handle means to be moved into different relative angular positions with respect to the body means. Furthermore, the point of pivotal connection of the handle means with the body means is at the lower rear portion of the body means which enables better control of movement of the apparatus.

A guard means is also incorporated in the structure of the present invention, this guard means being disposed adjacent to the movable cutter means in such a relationship as to direct the flow of clippings in a particular manner. This enables the clippings to be directed away from the sidewalk or the like thereby substantially eliminating the necessity of subsequently cleaning off the sidewalk, for example.

No additional coupling means is required in the present invention for connecting the power drill to the rotatable cutter means, but on the contrary the rotatable cuter means is conneced to the drill through the intermediary of the conventional drill chuck mechanism.

Additionally, adjustment means is provided in the present invention, a plurality of adjustable members being supported by the body means and beiny interengageable with spaced portions of an associated power drill so that the axis of rotation of the rotatable cutter member supported by the drill may be accurately positioned so as to properly cooperate with the ledger blade of the apparatus.

BRIEF DESCRIPTION OF THE DRAWING

FIG. 1 is a side view of a lawn edge and hedge trimmer according to the present invention;

FIG. 2 is a front view of the apparatus shown in FIG. 1;

FIG. 3 is a sectional view taken substantially along line 3—3 of FIG. 1 looking in the direction of the arrows;

FIG. 4 is an exploded perspective view illustrating certain components of the structure shown in FIG. 1;

FIG. 5 is a sectional view taken substantially along line 5—5 of FIG. 3 looking in the direction of the arrow; and FIG. 6 is a top perspective view partly broken away illustrating the construction of the handle of the present invention.

DESCRIPTION OF THE PREFERRED EMBODIMENT

Referring now to the drawing wherein like reference characters designate corresponding parts throughout the several views, a body means indicated generally by reference numeral 10 may comprise a cast structure formed of a suitable metallic substance. This body means includes an integral depending portion 12 at the lower rear end thereof, the lower part of portion 12 having a bore extending therethrough which receives a nut and bolt assembly indicated generally by reference numeral 14 for rotatably supporting a pair of wheels 16 at opposite sides of portion 12. These wheels 16 may be of the type as employed on roller skates whereby the wheels are supported on suitable bearings for free rotation. The wheels are disposed substantially equidistantly on either side of the longitudinal axis of the apparatus as indicated by reference character X in FIG. 2 whereby the wheels serve to support the apparatus for ready movement and to stabilize movement thereof.

As seen most clearly in FIG. 1, the body means 10 includes an integral upstanding portion 20 which has a bore formed therethrough which receives a nut and bolt assembly 22 for pivotally supporting the handle of the apparatus hereinafter described.

As seen in FIG. 6, the handle is indicated generally by reference numeral 26 and includes an elongated tubular portion 28 of sufficient length so that the handle may be readily operated when a person is standing erect. An enlarged portion 30 is secured to the lower end of tubular portion 28 and includes a pair of spaced ears 32 and 34 having aligned holes 36 and 38 formed therethrough for receiving the bolt of the nut and bolt assembly 22 whereby the handle is pivotally supported on the body means.

A stop portion 40 is also formed integral with the portion 30 of the handle. This stop portion 40 is adapted to engage the rear surface 44 of the body means as seen in FIG. 1. The lower end of the handle is illustrated in phantom lines in FIG. 1, and as seen in this figure, the handle is disposed in one limit position thereof wherein the stop portion 40 on the handle engages the surface 44 of the body means.

Referring again ot FIG. 6, the handle includes oppositely extending portions 46 at the upper end thereof having hand grip portions 48 one of which is illustrated for manual grasping when the apparatus is to be employed as a lawn edger and manually manipulated by the handle.

As seen most clearly in FIG. 4, the body means 10 includes a saddle portion comprising a curved recess 50 formed in the upper surface thereof disposed intermediate a pair of raised integral portions 52. This saddle portion is adapted to receive a portion of a power drill hereinafter described. The two portions 52 serve to reinforce the body means adjacent to a groove 54 formed in the undersurface thereof.

A holding means includes a flexible metallic band 60 having a central portion thereof fixed to the body means through the intermediary of a rivet 64 extending through aligned holes formed in the band 60 and the body means 10. A conventional tightening mechanism 68 is secured to the opposite free ends of the band so that the band can be tightened in the usual manner about a power drill mounted on the apparatus.

A conventional hand-operated power drill is indicated generally by reference numeral 70 and includes a body portion 72 which is engaged by the band 60 to hold the the power drill in place on the apparatus. The power drill includes a pistol grip handle portion 74 having a trigger 76 for energizing the motor thereof. A latching means 78 is provided for holding the trigger in an "on" position when the apparatus is being manually manipulated by the handle associated therewith. A power cable 79 extends from the drill to a suitable source of electrical energy.

The drill also includes a driven shaft 880 having the conventional chuck mechanism 82 at the outer end thereof.

Adjustment means includes a first adjusting bolt 90 which is threaded within a correspondingly threaded bore provided in a boss 92 on the body means. A lock nut 94 is also threaded on bolt 90 for locking the bolt in desired operative position. It is apparent that the upper end of the bolt is adapted to engage a portion of the power drill for adjusting the position thereof.

The adjustment means includes a second adjusting bolt 100 spaced longitudinally from the first adjusting bolt, this second adjusting bolt being threaded through a correspondingly threaded bore provided in a boss 102 on the body means. A lock nut 104 is threaded on bolt 100 for locking it in operative position. Here again, it is apparent that the upper end of the adjusting bolt is adapted to engage a portion of the power drill for adjusting the position thereof, and the lock nut 104 is adapted to hold the adjusting bolt in adjusted position.

Each of the adjusting bolts is disposed substantially along the center line of the apparatus, and by suitably moving these adjusting bolts in cooperation with the holding band 60, it is evident that the position of the power drill 70 on the body means may be accurately adjusted.

As seen most clearly in FIG. 4, a rotatable cutting blade or cutter means is indicated generally by reference numeral 110 and includes a shaft 112 extending therefrom, this shaft being received within the chuck mechanism 82 of the power drill for operatively connecting the cutter means with the drill.

Cutter means 110 includes a pair of oppositely extending blades 114 and 116 having outer cutting edges 118 and 120 respectively formed thereon, these cutting edges preferably being disposed at an angle of approximately 12 to 15° with respect to the axial center line of shaft 112.

As seen most clearly in FIG. 4, the forward end of the body means 10 has a flange 130 extending substantially normally to the main part of the body means, this flange 130 having a reinforcing rib 132 formed on the forward face thereof.

A ledger blade is indicated generally by reference numeral 136 and includes a forwardly projecting portion 138 having a cutting edge 140 formed thereon. The ledger blade also includes an upwardly extending portion 142 adapted to rest against the forward face of the flange 130 of the body means, portion 142 having a hole 144 formed therethrough.

The ledger blade 136 is retained in operative position by means of a bolt 148 which extends through hole 144 and through a hole 150 formed in the flange 130 of the body means, a nut 152 being threaded on the outer end of bolt 148. This manner of mounting the ledger blade on the body means permits it to be adjusted with respect thereto so as to enable proper cutting action with respect to the rotatable cutter means 110.

It is apparent that by adjusting the position of the power drill with respect to the body means, and further by adjusting the position of the ledger blade, accurate intercooperation between the various cutting edges may be obtained for optimum results.

A guard means is indicated generally by reference numeral 160 and includes an arcuate wall portion 162 disposed outwardly of the rotatable cutter means 110 and being somewhat less than semicircular as seen in FIG. 2. It is apparent that the arcuate wall 162 of the guard means will cause the clippings as seen in FIG. 2 to be directed to the left in that figure, and will prevent the clippings from being directed to the right in the figure, and accordingly, the direction in which the clippings fly away from the apparatus is controlled.

The guard means also includes a wall portion 164 having an integral laterally extending part 166 formed thereon. Portion 166 is disposed immediately behind the flange 130 of body means 10, and has a hole 168 formed therethrough for receiving bolt 148.

It is accordingly apparent that the bolt 148 serves to hold both the ledger blade and the guard means in operative position on the body means and permits adjustment and removal of the ledger blade or the guard means from the body means if so desired.

It is apparent from the foregoing that there is provided according to the present invention a new and novel lawn edge and hedge trimmer including wheels for supporting the apparatus for ready movement and for stabilizing movement thereof.

The handle of the present invention is adapted to pivot into various angular relationships with respect to the body means and the pivotal movement of the handle with respect to the body means is limited by the interengagement of portion 40 of the handle with the surface 44 of the body means. No additional coupling means is required for connecting the drill to the movable cutter means since the movable cutter means is connected directly with the chuck mechanism of the drill. The drill can further be readily adjusted with respect to the body means as hereinbefore described.

When it is desired to employ the device as a hedge or bush trimmer, the handle may be removed, and in order to more conveniently handle the device, the drill may be inverted from the position shown in FIG. 1 to its normal operative position.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A lawn edge and hedge trimmer comprising a body means, holding means supported by said body means for holding a power drill in operative position relative to said body means, adjustment means carried by said body means adapted to engage and adjust the position of a drill to be held on said body means, ledger blade means supported by said body means, said ledger blade means having an edge adapted to coact with a rotary cutting blade to be rotatably supported by said drill so as to effectively cut vegetation disposed between said ledger blade means and said rotary cutting blade, said adjustment means including movable means mounted for adjustment relative to said holding means and engageable with a drill to be held by said body means to finely adjust the position of said drill relative to said body means and position said rotary cutting blade relative to said ledger blade means.

2. Apparatus as defined in claim 1 wherein said adjustment means includes a pair of spaced members mounted for adjustable movement with respect to said body means and adapted to engage the drill at spaced points.

3. Apparatus as defined in claim 2 wherein said body means is elongated along the longitudinal axis, and said adjustment means comprises a pair of adjusting bolt means spaced longitudinally along said body means.

4. Apparatus as defined in claim 1 including anti-friction wheel means supported by said body means to facilitate movement of the apparatus along a supporting surface.

5. Apparatus as defined in claim 4 wherein said body means is elongated and has a longitudinal axis, said anti-friction wheel means comprising a pair of wheels spaced substantially equidistantly on either side of the longitudinal axis of the body means to stabilize movement thereof.

6. Apparatus as defined in claim 1 wherein said body means includes a saddle portion formed thereon for engaging a power drill and serving to accurately position an associated power drill relative to said body means.

7. Apparatus as defined in claim 1 including handle means pivotally interconnected with said body means at the lower rear portion thereof.

8. Apparatus as defined in claim 1 including wheel means rotatably supported by the lower rear portion of said body means, handle means pivotally interconnected with said body means at said lower rear portion thereof and adjacent to said wheel means.

9. Apparatus as defined in claim 8 including means for limiting pivotal movement of said handle means with respect to said body means.

10. Apparatus as defined in claim 1 including guard means supported by said body means, said guard means defining an arcuate guard portion for directing clippings in a particular direction relative to the apparatus, said guard means being disposed adjacent said cutter blade means.

11. A lawn edge and hedge trimmer comprising a substantially horizontally disposed one-piece elongated body means, holding means supported by said body means for holding a power drill in operative position relative to said body means with the longitudinal axis of said drill disposed parallel to the longitudinal axis of said body means, adjustment bolt means carried by said body means adapted to engage and adjust the position of a drill to be held on said body means, ledger blade means adjustably supported by said body means adjacent one end thereof, said ledger blade means having an edge adapted to coact with a rotary cutting blade to be rotatably supported by said drill so as to effectively cut vegetation disposed between said ledger blade means and said cutting blade means, said adjustment of said drill positioning said cutting blade relative to said ledger blade.

12. A lawn edge and hedge trimmer comprising a body means, holding means supported by said body means for holding a power drill in operative position relative to said body means, adjustment means carried by said body means adapted to engage and adjust the position of a drill held on said body means, ledger blade means supported by said body means, said ledger blade means having an edge adapted to coact with a rotary cutting blade to be rotatably supported by said drill so as to effectively cut vegetation disposed between said ledger blade means and said cutting blade means, and guard means adjustably mounted to said body means adapted to at least partially surround said cutting blade means and adjustable to different positions relative to said body means and said ledger blade means.

References Cited

UNITED STATES PATENTS

| | | | |
|---|---|---|---|
| 2,932,144 | 4/1960 | Garner et al. | 56—25.4 |
| 2,970,419 | 2/1961 | Lieberman | 56—256 X |
| 3,017,733 | 1/1962 | Evans | 56—25.4 |
| 3,155,167 | 11/1964 | Pendley | 56—256 X |

RUSSELL R. KINSEY, Primary xaminer

U.S. Cl. X.R.

56—256